(No Model.)
O. T. HOUGEN & G. W. PAULUS.
IMPLEMENT HOLDER FOR TABLETS, &c.
No. 478,794. Patented July 12, 1892.
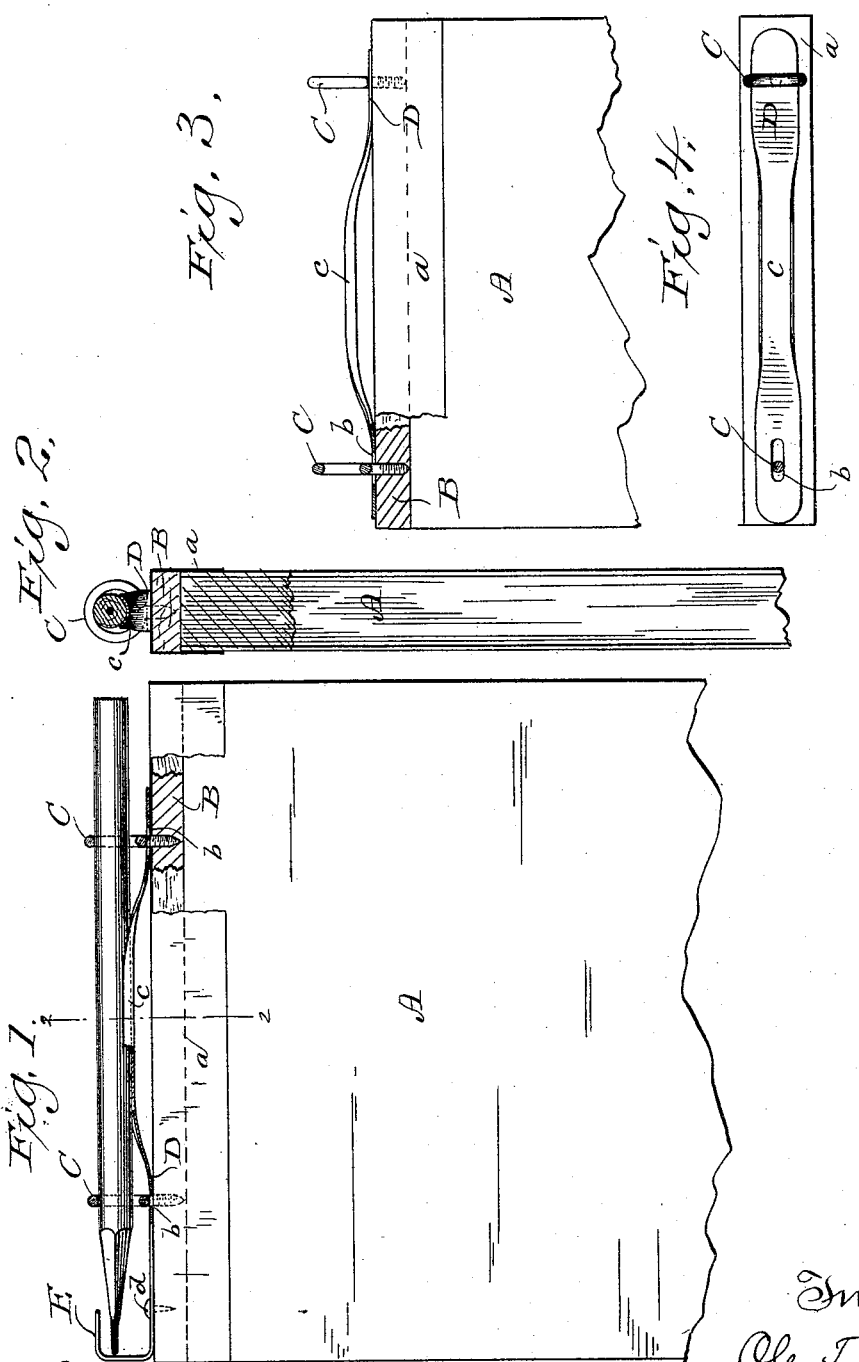
Witnesses
Geo. W. Young
Wm Klug
Inventors:
Ole T. Hougen
George W. Paulus
By H. G. Underwood
N. Worney

UNITED STATES PATENT OFFICE.

OLE T. HOUGEN AND GEORGE W. PAULUS, OF GRAND RAPIDS, WISCONSIN.

IMPLEMENT-HOLDER FOR TABLETS, &c.

SPECIFICATION forming part of Letters Patent No. 478,794, dated July 12, 1892.

Application filed October 31, 1891. Serial No. 410,440. (No model.)

*To all whom it may concern:*

Be it known that we, OLE T. HOUGEN and GEORGE W. PAULUS, citizens of the United States, and residents of Grand Rapids, in the county of Wood, and in the State of Wisconsin, have invented certain new and useful Improvements in Implement-Holders for Tablets, &c.; and we do hereby declare that the following is a full, clear, and exact description thereof.

The object of our invention is to provide an implement-holder for tablets, slates, and analogous devices that will automatically retain the implement in position and prevent any accidental removal thereof; and to this end our invention consists in certain peculiarities of construction and arrangement of parts to be hereinafter described, with reference to the accompanying drawings, and subsequently claimed.

In the drawings, Figure 1 represents a plan view of a portion of a tablet provided with one form of our device, certain of the parts being in section and partly broken away for the purpose of better illustration; Fig. 2, a section on line 2 2 of Fig. 1; Fig. 3, a plan view of a portion of a tablet provided with another form of our device, with certain of the parts in section and partly broken away; and Fig. 4, a detail view of the same with one of the implement-supports removed.

Referring by letter to the drawings, A represents a tablet of paper, and B a strip of wood or other suitable material, preferably secured, as by the covering $a$, to the upper edge of the tablet, said strip B being provided upon its upper side with supports in the form of screw-eyes C, that are arranged a suitable distance apart.

D represents a spring-plate provided with openings $b$ for engagement with the shanks of said screw-eyes, said plate being bowed up intermediate of the openings and having the edges of this bowed portion struck up to thus form a guide $c$, the latter being in alignment with the aforesaid screw-eyes; but we do not limit ourselves to this form of spring-guide.

From the foregoing description it will be seen that by inserting a pencil or other implement through one of the screw-eyes the forward end thereof will come upon the guide $c$, and by pushing the pencil forward still farther it will be guided onto and through the other screw-eye, whereby said spring-plate is slightly depressed and constantly kept in frictional contact with the pencil, thus preventing the latter from being accidentally removed when handling the tablet.

To allow the spring-plate D to yield to the pressure of the pencil when inserted in the screw-eyes, we slightly elongate one of the openings $b$ in said plate, whereby one end of the latter is free to move, the other end being stationary, although, if found desirable, both openings may be elongated and the same result accomplished.

In Fig. 1 we show another form of our device wherein the same shape of spring-plate is employed, with the exception that one end thereof terminates in an approximately-$\Gamma$-shaped point-protector E, and to prevent the latter from being bent or raised out of position we suitably secure the same, as by tack $d$, to the strip B; but this protector, although part of our invention, is not absolutely necessary and may be omitted without affecting the function of said spring-plate as a holder for a pencil or analogous device, the manner of retaining the aforesaid spring-plate in place being the same in either of the forms shown.

Although we have shown and described our device secured to the upper edge of a tablet, it will be understood that the same may be secured to a side or lower edge thereof, or, if found desirable, it may be secured to slates and analogous devices.

Having thus described our invention, what we claim as new, and desire to secure by Letters Patent, is—

1. As an improved article of manufacture, an implement-holder for attachment to tablets and analogous devices, this holder consisting of supports for an implement and a spring-plate having perforations for passage therethrough of the shanks or stems of said supports, one or both of said perforations being elongated, and a portion of said plate forming a spring-guide intermediate of the supports to exert pressure on said implement when in position in the supports, substantially as set forth.

2. A tablet or analogous device provided with an implement-holder consisting of supports for the implement, and a spring-guide intermediate of the supports to exert pressure on said implement, substantially as set forth.

3. A tablet or analogous device provided with an implement-holder consisting of supports for an implement and a spring-plate having a portion thereof intermediate of the supports and a returned end, substantially as set forth.

4. A tablet or analogous device provided with an implement-holder consisting of supports for an implement and a longitudinally-slotted spring-plate having a portion thereof bowed up and arranged intermediate of the supports to exert pressure on said implement, substantially as set forth.

5. A tablet or analogous device provided with an implement-holder consisting of supports for an implement and a spring-plate having a bowed portion arranged intermediate of the supports and turned up at the edges thereof to form a guide, substantially as set forth.

6. A tablet or analogous device provided with a continuous independent base having implement-supports thereon and an independent spring-plate having a bowed portion arranged intermediate of the supports, substantially as set forth.

7. A tablet having a strip of wood or other analogous material secured to an edge thereof, implement-supports on the strip, and a spring-guide connected to said strip intermediate of the supports, substantially as set forth.

In testimony that we claim the foregoing we have hereunto set our hands, at Grand Rapids, in the county of Wood and State of Wisconsin, in the presence of two witnesses.

OLE T. HOUGEN.
GEORGE W. PAULUS.

Witnesses:
WM. H. LUEHE,
EDMUND H. LAVIGNE.